United States Patent
Okiga et al.

(10) Patent No.: US 11,437,663 B2
(45) Date of Patent: Sep. 6, 2022

(54) BATTERY PACK AND METHOD OF DISASSEMBLING BATTERY PACK

(71) Applicants: TOYOTA JIDOSHA KABUSHIKI KAISHA, Aichi (JP); SUBARU CORPORATION, Tokyo (JP)

(72) Inventors: Hiroshi Okiga, Toyota (JP); Satoru Seyama, Tokyo-to (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 99 days.

(21) Appl. No.: 17/090,853

(22) Filed: Nov. 5, 2020

(65) Prior Publication Data

US 2021/0175555 A1 Jun. 10, 2021

(30) Foreign Application Priority Data

Dec. 6, 2019 (JP) .............................. JP2019-221551

(51) Int. Cl.
| | |
|---|---|
| *H01M 10/54* | (2006.01) |
| *H01M 10/42* | (2006.01) |
| *H01M 50/116* | (2021.01) |
| *H01M 50/284* | (2021.01) |
| *H01M 6/52* | (2006.01) |

(52) U.S. Cl.
CPC .............. *H01M 10/54* (2013.01); *H01M 6/52* (2013.01); *H01M 10/425* (2013.01); *H01M 10/4257* (2013.01); *H01M 50/116* (2021.01); *H01M 50/284* (2021.01); *Y02W 30/84* (2015.05)

(58) Field of Classification Search
None
See application file for complete search history.

(56) References Cited

U.S. PATENT DOCUMENTS

| | | | |
|---|---|---|---|
| 2009/0018600 A1* | 1/2009 | Deininger | ........... H01M 50/247 320/113 |
| 2018/0045785 A1 | 2/2018 | Kodama et al. | |
| 2018/0269438 A1* | 9/2018 | Nishikawa | .......... H01M 10/058 |

FOREIGN PATENT DOCUMENTS

| | | | |
|---|---|---|---|
| JP | 2000-164181 | * | 6/2000 |
| JP | 201828967 A | | 2/2018 |

\* cited by examiner

*Primary Examiner* — Lisa S Park
(74) *Attorney, Agent, or Firm* — Hauptman Ham, LLP (57) ABSTRACT

A battery pack may include a component housed in a case. The component may include an adhesion projection and a first guide projection projecting from a bottom surface of the component. The first guide projection may include: a first portion overlapping the adhesion projection; and a second portion not overlapping the first portion. A projection degree of the first portion may be greater than or equal to a projection degree of the adhesion projection. The second portion may include an inclined portion, wherein a projection degree of the inclined portion increases toward the first portion so that a projection degree of the second portion increases from a value lower than the projection degree of the adhesion projection to a value greater than or equal to the projection degree of the adhesion projection. An end surface of the adhesion projection may be adhered to the inner surface.

8 Claims, 8 Drawing Sheets

BATTERY PACK AND METHOD OF DISASSEMBLING BATTERY PACK

CROSS-REFERENCE

This application claims priority to Japanese Patent Application No. 2019-221551, filed on Dec. 6, 2019, the entire contents of which are incorporated herein by reference.

TECHNICAL FIELD

The technology disclosed herein relates to a battery pack and a method of disassembling the battery pack.

BACKGROUND

Japanese Patent Application Publication No. 2018-028967 describes a technology of collecting a battery cell from an inside of a used battery pack for reuse.

SUMMARY

In many cases, a component inside the battery pack is adhered to a case. If the component can appropriately be separated from the case, the component and the case can be reused. The present disclosure proposes a battery pack that enables easily separating a component adhered to a case from the case.

A battery pack disclosed herein may comprise: a case; and a component housed in the case. The component may comprise: a bottom surface; an adhesion projection projecting from the bottom surface to an inner surface of the case; and a first guide projection projecting from the bottom surface to the inner surface of the case. The first guide projection may comprise: a first portion overlapping the adhesion projection when viewed along a direction parallel to the inner surface; a second portion not overlapping the first portion when viewed along the direction. A projection degree of the first portion to which the first portion projects from the bottom surface may be greater than or equal to a projection degree of the adhesion projection to which the adhesion projection projects from the bottom surface. The second portion may comprise an inclined portion, wherein a projection degree of the inclined portion to which the second portion projects from the bottom surface increases toward the first portion so that the projection degree of the second portion increases from a value lower than the projection degree of the adhesion projection to a value greater than or equal to the projection degree of the adhesion projection. An end surface of the adhesion projection may be adhered to the inner surface via an adhesive.

In this battery pack, when the component is separated from the case, a wire saw is inserted between the bottom surface of the component and the inner surface of the case to cut the adhesive. At this time, if the wire saw catches on a step between the bottom surface and the adhesion projection, the wire saw would fail to cut the adhesive and cause a scratch on the adhesion projection. In this battery pack, however, the guide projection includes the inclined portion, and the projection degree of the inclined portion increases from the value lower than the projection degree of the adhesion projection to the value greater than or equal to the projection degree of the adhesion projection, so that the wire saw is guided by the inclined portion to a position of the end surface of the adhesion projection (i.e., a position of the adhesive). This prevents the wire saw from catching on the step between the bottom surface and the adhesion projection. Therefore, the adhesive can be cut easily by the wire saw, and the component can be separated easily from the case.

DETAILED DESCRIPTION

Technical elements of a battery pack to be described below will be listed below. The following technical elements are independently useful.

In an aspect of the battery pack disclosed herein, an interval may be provided at least partially between the first guide projection and the adhesion projection.

This configuration can suppress the adhesive spreading to a surface of the first guide projection when the adhesion projection is adhered to the inner surface of the case in manufacturing the battery pack. This can suppress the adhesive spreading to an unintended position.

In an aspect of the battery pack disclosed herein, the battery pack may further comprise a second guide projection projecting from the bottom surface to the inner surface. The adhesion projection may comprise a plurality of adhesion projections with an interval between the adhesion projections. The second guide projection may comprise a third portion overlapping the interval when viewed along the direction. A projection degree of the third portion to which the third portion projects from the bottom surface may be greater than or equal to projection degrees of the adhesion projections.

This configuration can suppress the wire saw catching on the interval between the plurality of adhesion projections. The component can therefore be separated more easily from the case.

In an aspect of the battery pack disclosed herein, the second guide projection may comprise fourth portions overlapping the adhesion projections arranged on both sides of the interval when viewed along the direction. Each fourth portion may comprise an inclined portion, wherein a projection degree of each fourth portion to which each fourth portion projects from the bottom surface may increase toward the third portion so that the projection degree of each fourth portion may increase from a value lower than the projection degrees of the adhesion projections to a value greater than or equal to the projection degrees of the adhesion projections.

This configuration can more effectively suppress the wire saw catching on the interval between the plurality of adhesion projections. The component can therefore be separated more easily from the case.

In an aspect of the battery pack disclosed herein, an interval may be provided at least partially between the second guide projection and the adhesion projections.

This configuration can reduce the adhesive spreading to a surface of the second guide projection when the adhesion projection is adhered to the inner surface of the case at the step of manufacturing the battery pack. This can reduce the adhesive spreading to an unintended position.

In an aspect of the battery pack disclosed herein, a cooler may be connected to an outer surface of the case at a spot, and the adhesion projection may be adhered to the inner surface of the case within the spot.

This configuration enables effectively cooling the component.

In an aspect of the battery pack disclosed herein, the battery pack may further comprise a battery cell housed in the case. The component may include a circuit component connected to the battery cell.

In an aspect of a method of disassembling the battery pack disclosed herein, the method may comprise cutting the adhesive by a wire saw.

This method enables easily separating the component from the case.

Figure 1:
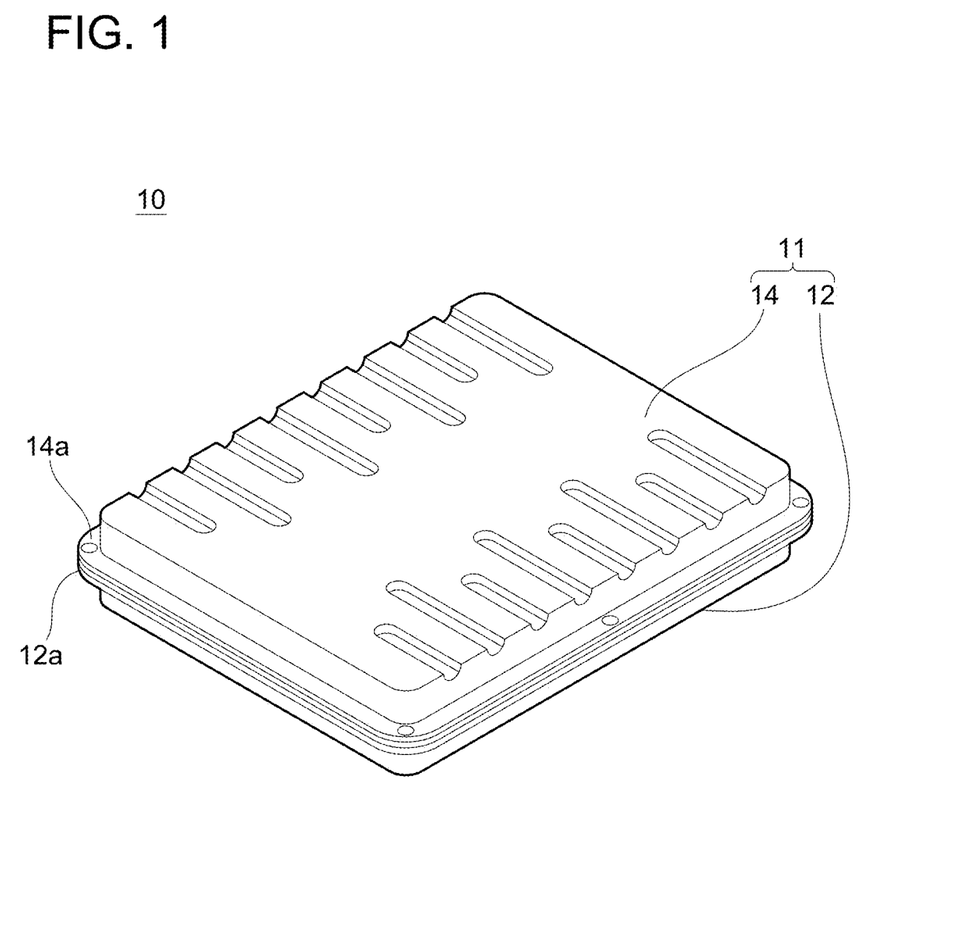
FIG. 1 is a perspective view of a battery pack.
Figure 2:
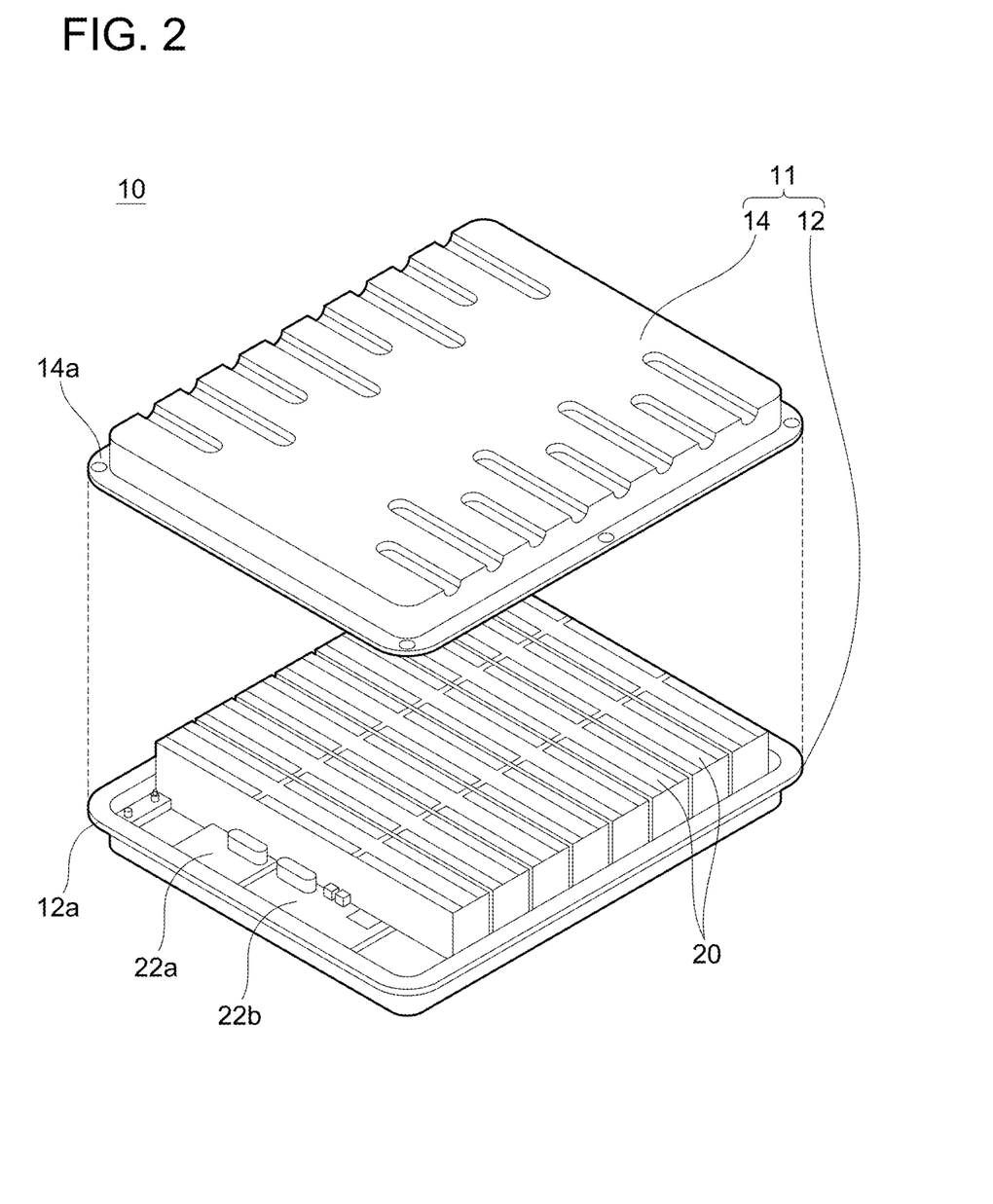
FIG. 2 is an exploded perspective view of the battery pack.
Figure 3:
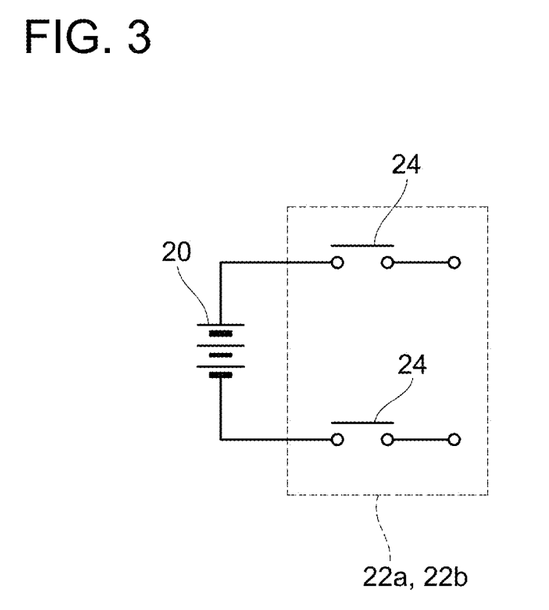
FIG. 3 is a circuit diagram of the battery pack.

FIGS. 1 and 2 show a battery pack 10 in an embodiment. The battery pack 10 includes a case 11 that includes a tray 12 and a cover 14. The tray 12 has a cup shape. The tray 12 includes a peripheral portion 12a having a flange shape. The cover 14 has a cap shape. The cover 14 includes a peripheral portion 14a having a flange shape. The peripheral portion 14a of the cover 14 is coupled to the peripheral portion 12a of the tray 12. As shown in FIG. 2, the case 11 houses a plurality of battery cells 20 and a plurality of junction boxes 22a, 22b. As shown in FIG. 3, the junction boxes 22a, 22b each include a wiring linked to the battery cells 20, and a relay 24 interposed in the wiring. Power from the battery cells 20 is supplied to an outside of the case 11 via the junction boxes 22a, 22b. Since structures for attaching the junction boxes 22a, 22b to the case 11 are substantially equal, the structure for attaching the junction box 22a thereto will hereinafter be described.

Figure 4:
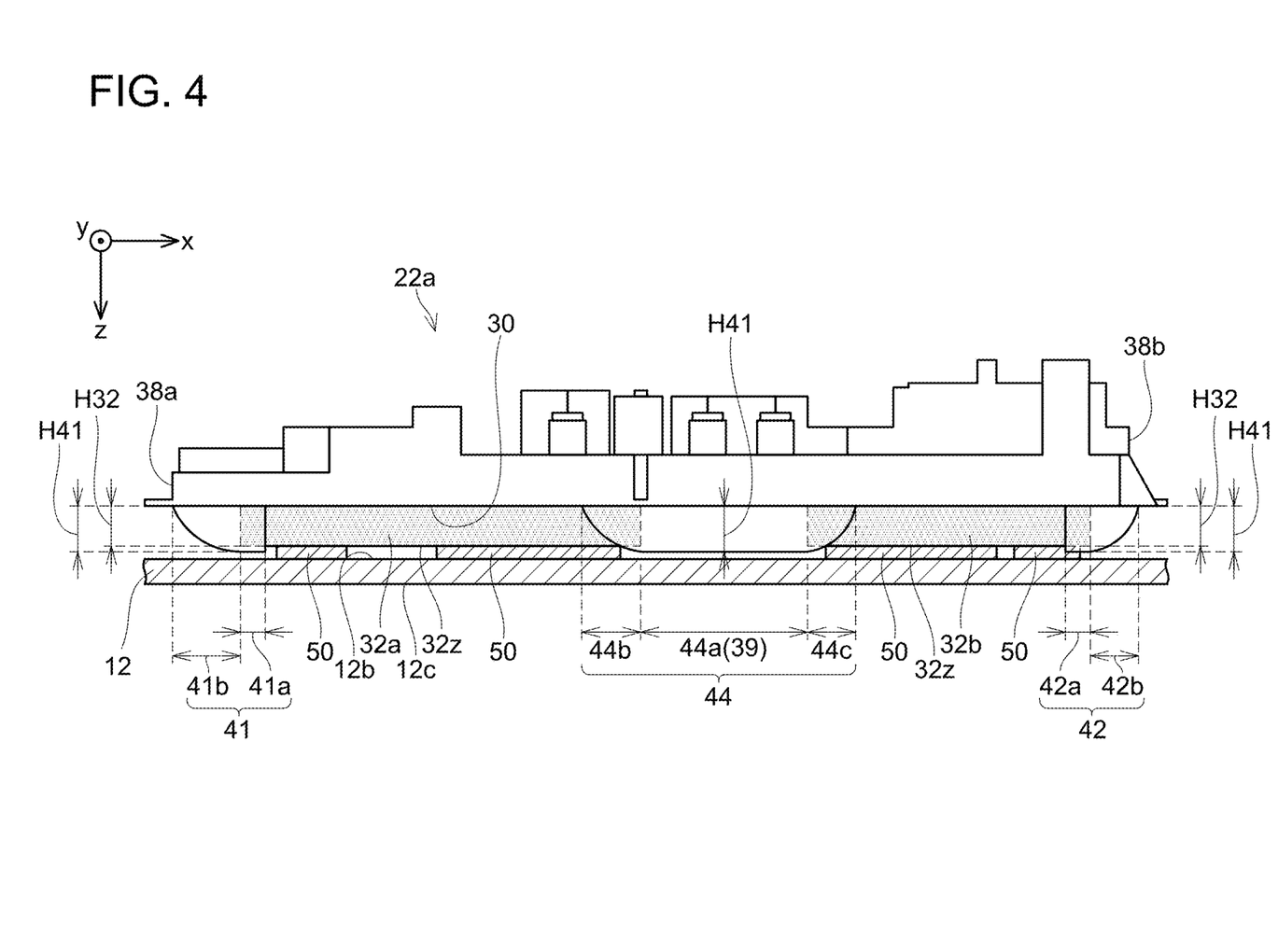
FIG. 4 is a cross-sectional view of a junction box and a tray.

As shown in FIG. 4, the junction box 22a is installed on the tray 12. The junction box 22a is fixed to an inner surface 12b of the tray 12. A direction perpendicular to the inner surface 12b of the tray 12 will hereinafter be termed a z direction. A direction parallel to the inner surface 12b of the tray 12 will be termed an x direction. A direction orthogonal to the z direction and the x direction will be termed a y direction.

Figure 5:
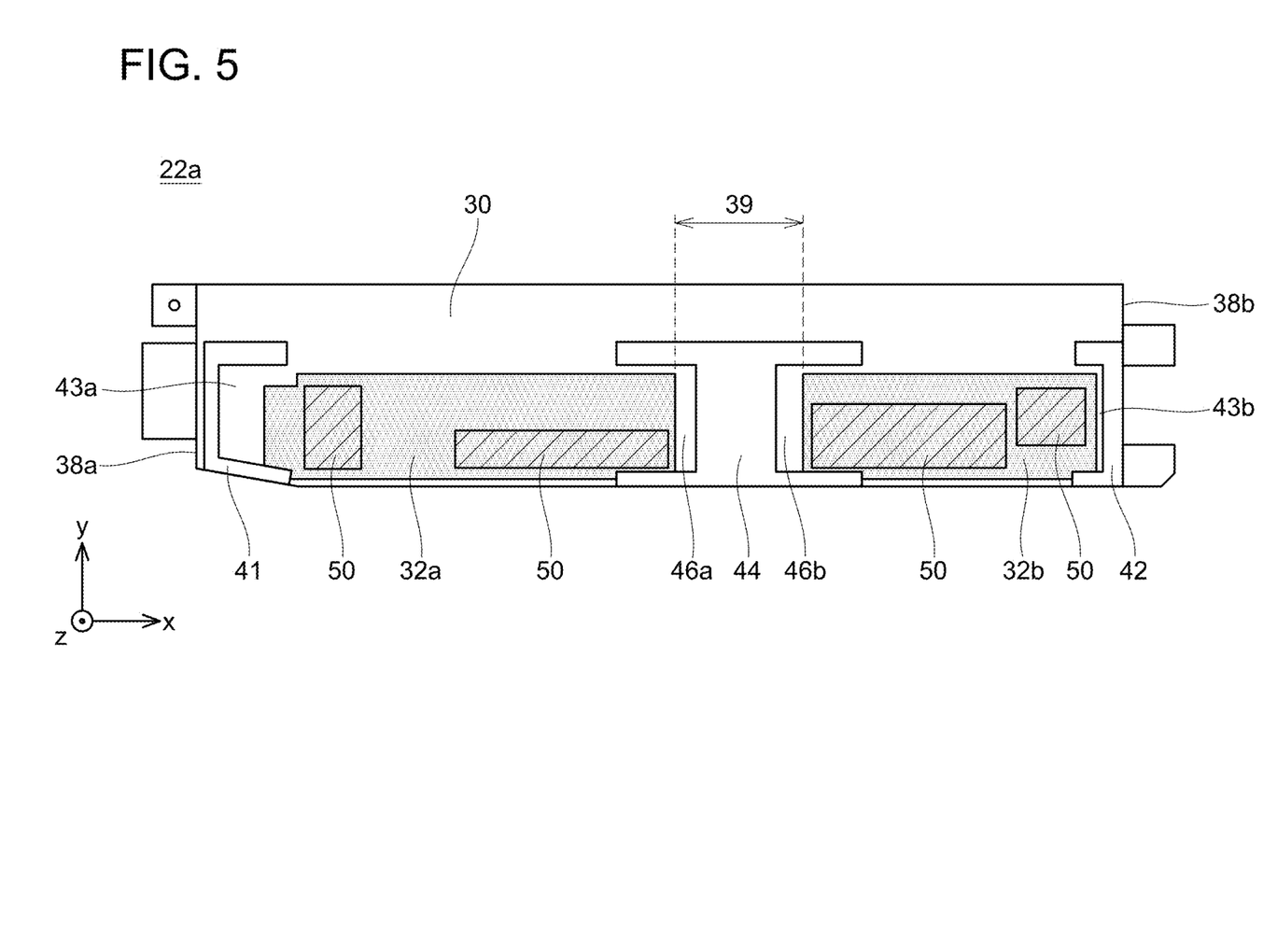
FIG. 5 is a plan view of the junction box viewed from a bottom surface side.

As shown in FIGS. 4 and 5, the junction box 22a extends long in the x direction. The junction box 22a has a bottom surface 30. The bottom surface 30 opposes the inner surface 12b of the tray 12. The bottom surface 30 is a flat surface parallel to the inner surface 12b of the tray 12. The bottom surface 30 is provided with two adhesion projections 32a, 32b and three guide projections 41, 42, 44. FIGS. 4 and 5 show the adhesion projections 32a, 32b by dot hatching and show an adhesive 50 by diagonal hatching for easy viewing. The adhesion projections 32a, 32b and the guide projections 41, 42, 44 project from the bottom surface 30 to the inner surface 12b of the tray 12.

The adhesion projection 32a and the adhesion projection 32b are placed in the x direction with an interval therebetween. The adhesion projection 32a is provided at a position close to one end 38a of the junction box 22a in the x direction, and the adhesion projection 32b is provided at a position close to the other end 38b of the junction box 22a in the x direction. The adhesion projections 32a, 32b each project downward from the bottom surface 30 to a projection degree H32. The adhesion projections 32a, 32b each have an end surface 32z (a lower surface) opposing the inner surface 12b of the tray 12. Each end surface 32z partially has the adhesive 50 applied thereto. The adhesive 50 sticks to the end surface 32z and to the inner surface 12b of the tray 12. The adhesion projections 32a, 32b are adhered to the tray 12 by the adhesive 50.

As shown in FIG. 5, the guide projection 41 is placed between the end 38a of the junction box 22a and the adhesion projection 32a. The guide projection 41 includes a portion extending long along the end 38a along the y direction, and a portion extending long from each of both ends of the portion along the x direction. Each portion of the guide projection 41 that extends long along the x direction extends to a position adjacent to the adhesion projection 32a in the y direction. As shown in FIG. 4, therefore, the guide projection 41 includes a portion 41a overlapping the adhesion projection 32a and a portion 41b not overlapping the adhesion projection 32a when viewed along the y direction. An end surface (lower surface) of the portion 41a is a plane parallel to the bottom surface 30. The portion 41a projects downward from the bottom surface 30 to a projection degree H41. The projection degree H41 is greater than or equal to the projection degree H32 of the adhesion projection 32a. The portion 41b is placed at a position closer to the end 38a than the portion 41a is. The portion 41b has an end surface (lower surface) tilted relative to the bottom surface 30. The end surface of the portion 41b is tilted to be displaced more downward toward the portion 41a. In other words, a projection degree of the portion 41b increases toward the portion 41a. At a position closest to the end 38a, the projection degree of the portion 41b is lower than the projection degree H32 (approximately zero). The projection degree of the portion 41b increases toward the portion 41a so that the projection degree of the portion 41b increases to a value greater than the projection degree H32 (more specifically, a value equal to the projection degree H41 of the portion 41a). The portion 41b is therefore smoothly connected to the portion 41a. As shown in FIG. 5, an interval 43a is provided at least partially between the guide projection 41 and the adhesion projection 32a.

The guide projection 42 has substantially the same structure as that of the guide projection 41. As shown in FIG. 5, the guide projection 42 is placed between the end 38b of the junction box 22a and the adhesion projection 32b. As shown in FIG. 4, the guide projection 42 includes a portion 42a overlapping the adhesion projection 32b and a portion 42b not overlapping the adhesion projection 32b when viewed along the y direction. An end surface (lower surface) of the portion 42a is a plane parallel to the bottom surface 30. The portion 42a projects downward from the bottom surface 30 to the projection degree H41 (i.e., the same projection degree as that of the portion 41a of the guide projection 41). The portion 42b is placed at a position closer to the end 38b than the portion 42a is. The portion 42b has an end surface (lower surface) tilted relative to the bottom surface 30. The portion 42b has a projection degree that increases toward the portion 42a. At a position closest to the end 38b, the projection degree of the portion 42b is lower than the projection degree H32 of the adhesion projection 32b (approximately zero). The projection degree of the portion 42b increases toward the portion 42a so that the projection degree of the portion 42b increases to a value greater than the projection degree H32 (more specifically, a value equal to the projection degree H41 of the portion 42a). The portion 42b is therefore smoothly connected to the portion 42a. As shown in FIG. 5, an interval 43b is provided at least partially between the guide projection 42 and the adhesion projection 32b.

As shown in FIGS. 4 and 5, the guide projection 44 is placed at and in the periphery of an interval 39 between the adhesion projections 32a and 32b. The guide projection 44 includes a portion extending long along the y direction, and portions each extending long from each of both ends of the portion along the x direction. The portions of the guide projection 44 that extend longitudinally along the x direction extend to respective positions adjacent to the adhesion projections 32a, 32b in the y direction. As shown in FIG. 4, therefore, the guide projection 44 includes, when viewed along the y direction, a portion 44a overlapping the interval 39, a portion 44b overlapping the adhesion projection 32a, and a portion 44c overlapping the adhesion projection 32b. An end surface (lower surface) of the portion 44a is a plane parallel to the bottom surface 30. The portion 44a projects downward from the bottom surface 30 to the projection degree H41 (i.e., the same projection degree as that of the portion 41a of the guide projection 41). The portion 44b has an end surface (lower surface) tilted relative to the bottom surface 30. The end surface of the portion 44b is tilted to be displaced more downward toward the portion 44a. In other words, the portion 44b has a projection degree that increases toward the portion 44a. At a position farthest from the portion 44a, the projection degree of the portion 44b is lower than the projection degree H32 (approximately zero). The projection degree of the portion 44b increases toward the portion 44a so that the projection degree of the portion 44b increases to a value greater than the projection degree H32 (more specifically, a value equal to the projection degree H41 of the portion 44a). The portion 44c has an end surface (lower surface) tilted relative to the bottom surface 30. The end surface of the portion 44c is tilted to be directed more downward toward the portion 44a. In other words, the portion 44c has a projection degree that increases toward the portion 44a. At a position farthest from the portion 44a, the projection degree of the portion 44c is lower than the projection degree H32 (approximately zero). The projection degree of the portion 44c increases toward the portion 44a so that the projection degree of the portion 44c increases to a value greater than the projection degree H32 (more specifically, a value equal to the projection degree H41 of the portion 44a). As shown in FIG. 5, an interval 46a is provided at least partially between the guide projection 44 and the adhesion projection 32a. An interval 46b is provided at least partially between the guide projection 44 and the adhesion projection 32b.

Figure 6:
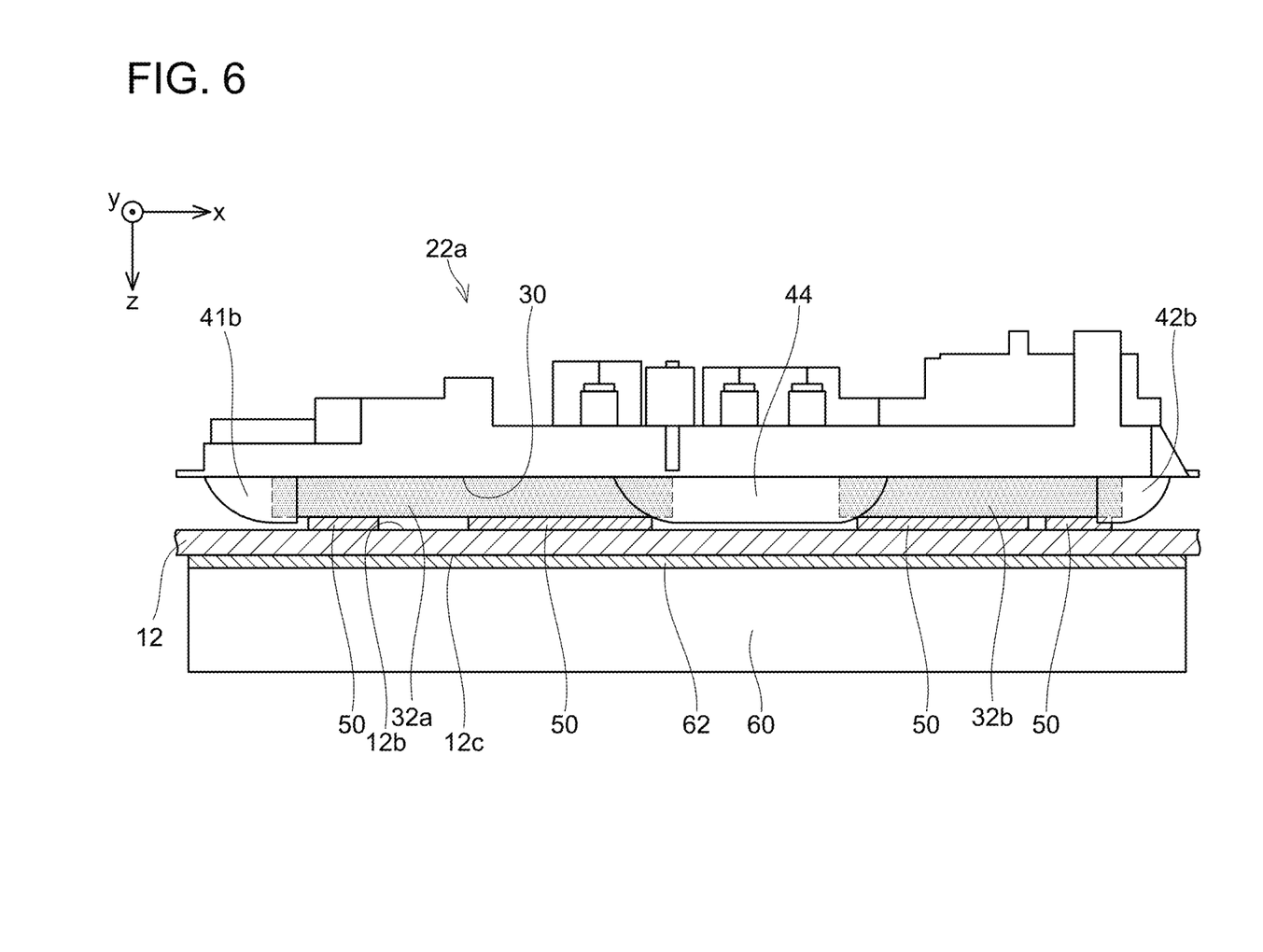
FIG. 6 is a cross-sectional view of the junction box, the tray, and a cooler.

As shown in FIG. 6, a cooler 60 is placed below the junction box 22a. The cooler 60 is a liquid-circulation cooler. The cooler 60 is adhered to an outer surface 12c (a lower surface) of the tray 12 with an electrically insulative adhesive 62 having high thermal conductivity. The cooler 60 cools the junction box 22a. Illustration of the cooler 60 are omitted from the other drawings.

Figure 7:
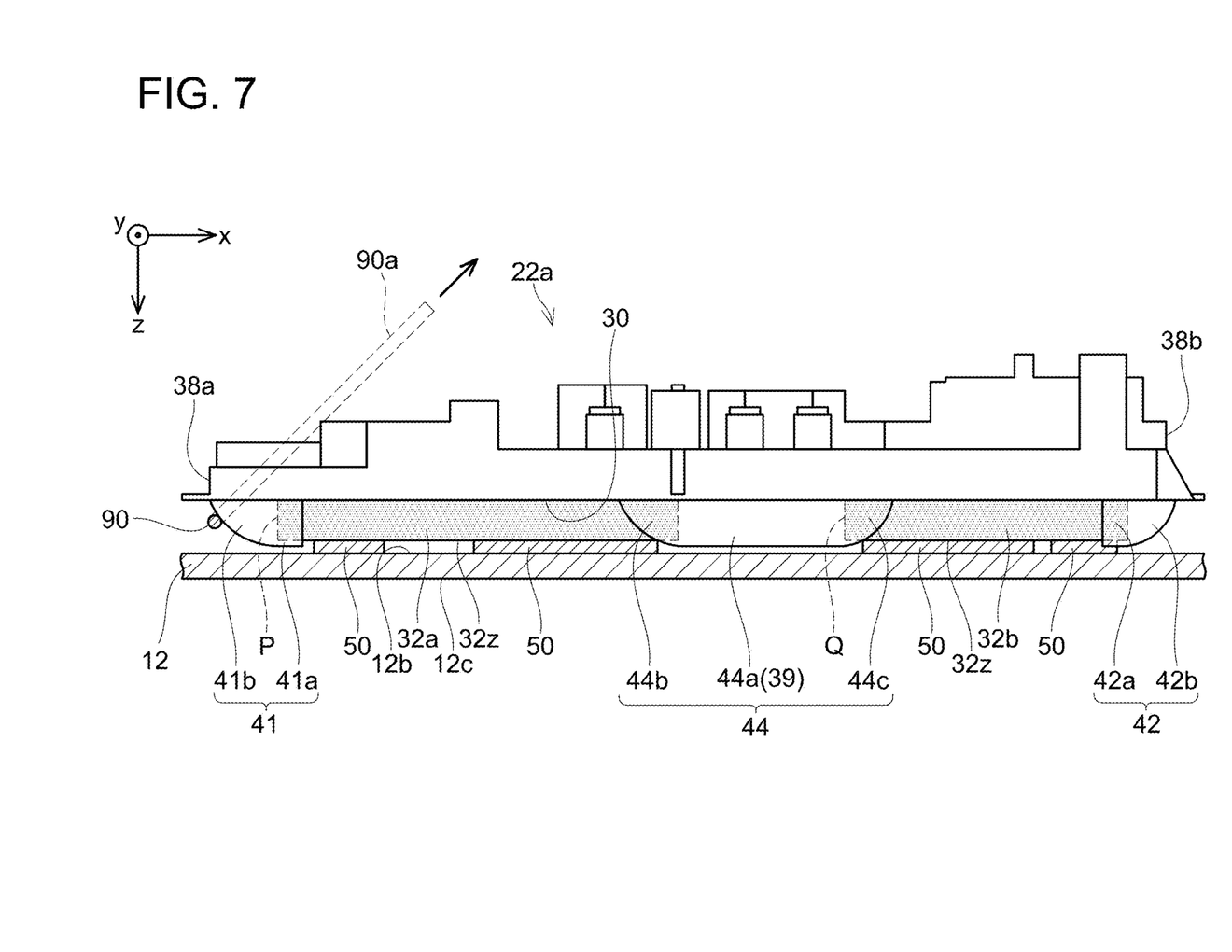
FIG. 7 is an explanatory diagram showing a method of disassembling the battery pack.

Next, a method of detaching the junction box 22a from the tray 12 will be described. When the junction box 22a is detached from the tray 12, a wire saw 90 is inserted between the bottom surface 30 of the junction box 22a and the inner surface 12b of the tray 12 as shown in FIG. 7. Although the wire saw 90 is inserted from an end 38a side in FIG. 7, the wire saw 90 may be inserted from an end 38b side. The case where the wire saw 90 is inserted from the end 38a side will hereinafter be described.

Figure 8:
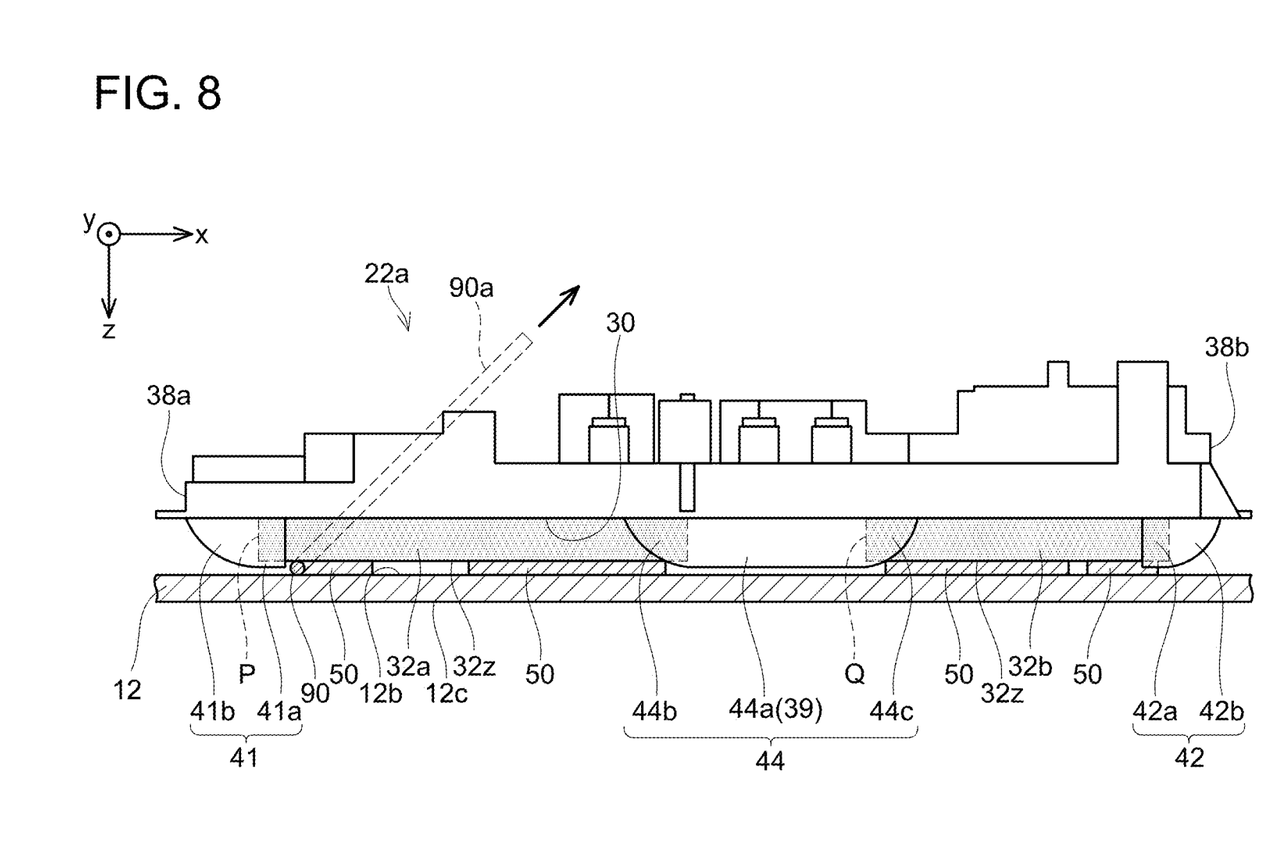
FIG. 8 is an explanatory diagram showing the method of disassembling the battery pack.

After the wire saw 90 is inserted between the bottom surface 30 of the junction box 22a and the inner surface 12b of the tray 12, both ends 90a of the wire saw 90 are pulled diagonally upward, by which a portion of the wire saw 90 is inserted between the junction box 22a and the tray 12 to move in the x direction (a direction toward the end 38b). The wire saw 90 is then guided by the portion 41b of the guide projection 41 to thereby move to between the portion 41a and the tray 12. The projection degree H41 of the portion 41a is greater than or equal to the projection degree H32 of the adhesion projection 32a, and hence when the wire saw 90 is further moved in the x direction, the wire saw 90 smoothly moves between the adhesion projection 32a and the tray 12 as shown in FIG. 8. This enables the wire saw 90 to cut the adhesive 50 between the adhesion projection 32a and the tray 12. Without the guide projection 41, the wire saw 90 catches on a step P between the adhesion projection 32a and the bottom surface 30, and hence moving the wire saw 90 between the adhesion projection 32a and the tray 12 is difficult. In contrast to this, since the guide projection 41 is provided, the wire saw 90 can easily move to between the adhesion projection 32a and the tray 12, which enables easily cutting the adhesive 50 therebetween.

When the wire saw 90 is further moved in the x direction (the direction toward the end 38b) while cutting the adhesive 50 between the adhesion projection 32a and the tray 12, the wire saw 90 is brought into contact with the portion 44b of the guide projection 44. The wire saw 90 moves along the surfaces of the portion 44b, the portion 44a, and the portion 44c in this order, and moves to between the adhesion projection 32b and the tray 12. This enables the wire saw 90 to cut the adhesive 50 between the adhesion projection 32b and the tray 12. By cutting the adhesive 50 between the adhesion projection 32b and the tray 12, the junction box 22a be detached from the tray 12. Without the guide projection 44, the wire saw 90 that has passed below the adhesion projection 32a enters the interval 39 between the adhesion projections 32a and 32b and catches on a step Q between the adhesion projection 32b and the bottom surface 30. In contrast to this, since the portion 44a of the guide projection 44 is provided at the interval 39, the wire saw 90 can be prevented from catching on the step Q. Moreover, even when the portion 44a is provided, if the portion 44b is not provided, the wire saw 90 may enter the interval 46a between the portion 44a and the adhesion projection 32a (see FIG. 5) and catch thereon. In contrast to this, since the portion 44b is provided, the wire saw 90 can be prevented from entering the interval 46a. The wire saw 90 is therefore guided by the guide projection 44 to thereby be able to smoothly move from a position below the adhesion projection 32a to a position below the adhesion projection 32b.

As described above, the structure of the battery pack 10 enables easily separating the junction box 22a from the tray 12 with use of the wire saw 90. Moreover, the structure enables separating the junction box 22a from the tray 12 while suppressing the junction box 22a and the tray 12 being scratched.

Moreover, in the battery pack 10, the intervals 43a, 43b, 46a, 46b are provided at least partially between corresponding two of the guide projections 41, 42, 44 and the adhesion projections 32a, 32b. Without the intervals 43a, 43b, 46a, 46b, when the adhesion projections 32a, 32b are bonded to the tray 12 via the adhesive 50 at the step of manufacturing the battery pack 10, an excess of the adhesive 50 might flow from the surfaces of the adhesion projections 32a, 32b to the surfaces of the guide projections 41, 42, 44. In a case where a large amount of the adhesive 50 is applied erroneously, the adhesive 50 might be spread further outward from the guide projections 41, 42, 44. In contrast to this, when the intervals 43a, 43b, 46a, 46b are provided, the excess of the adhesive 50 flows into the intervals 43a, 43b, 46a, 46b, which can prevent the adhesive 50 from being spread to an unintended spot. In a case where an excess of the adhesive 50 causes a serious problem, the guide projections 41, 42, 44 may be separated completely from the adhesion projections 32a, 32b by intervals. In contrast, in a case where an excess of the adhesive 50 causes no problem, the intervals 43a, 43b, 46a, 46b may be eliminated.

In the above-mentioned embodiment, the entirety of the portion 41b of the guide projection 41 is provided with a tilted surface. However, only a part of the portion 41b may be provided with a tilted surface. Moreover, the tilted surface may be provided across the portion 41b and the portion 41a. The same applies to the guide projection 42. Moreover, in the above-mentioned embodiment, the entirety of the portion 44b of the guide projection 44 is provided with a tilted surface. However, only a part of the portion 44b may be provided with a tilted surface. Moreover, the tilted surface may be provided across the portion 44b and the portion 44a. The same applies to the portion 44c.

A relation between constituents in the above-mentioned embodiment and constituents in the claims will be described. The junction box 22a in the embodiment is an example of "component" in the claims. The guide projections 41, 42 in the embodiment are each an example of "first guide projection" in the claims. The portions 41a, 42a in the embodiment are each an example of "first portion" in the claims. The portions 41b, 42b in the embodiment are each an example of "second portion" in the claims. The guide projection 44 in the embodiment is an example of "second guide projection" in the claims. The portion 44a in the embodiment is an example of "third portion" in the claims. The portions 44b, 44c in the embodiment are each an example of "fourth portion" in the claims.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A battery pack, comprising:
a case; and
a component housed in the case,
wherein
the component comprises:
a bottom surface;
an adhesion projection projecting from the bottom surface to an inner surface of the case; and
a first guide projection projecting from the bottom surface to the inner surface of the case,
the first guide projection comprises:
a first portion overlapping the adhesion projection when viewed along a direction parallel to the inner surface; and
a second portion not overlapping the first portion when viewed along the direction,
a projection degree of the first portion to which the first portion projects from the bottom surface is greater than or equal to a projection degree of the adhesion projection to which the adhesion projection projects from the bottom surface,
the second portion comprises an inclined portion, wherein a projection degree of the inclined portion to which the second portion projects from the bottom surface increases toward the first portion so that the projection degree of the second portion increases from a value lower than the projection degree of the adhesion projection to a value greater than or equal to the projection degree of the adhesion projection, and
an end surface of the adhesion projection is adhered to the inner surface via an adhesive.

2. The battery pack of claim 1, wherein an interval is provided at least partially between the first guide projection and the adhesion projection.

3. The battery pack of claim 1, further comprising a second guide projection projecting from the bottom surface to the inner surface,
wherein
the adhesion projection comprises a plurality of adhesion projections with an interval between the adhesion projections,
the second guide projection comprises a third portion overlapping the interval when viewed along the direction, and
a projection degree of the third portion to which the third portion projects from the bottom surface is greater than or equal to projection degrees of the adhesion projections.

4. The battery pack of claim 3, wherein
the second guide projection comprises fourth portions overlapping the adhesion projections arranged on both sides of the interval when viewed along the direction, and
each fourth portion comprises an inclined portion, wherein a projection degree of each fourth portion to which each fourth portion projects from the bottom surface increases toward the third portion so that the projection degree of each fourth portion increases from a value lower than the projection degrees of the adhesion projections to a value greater than or equal to the projection degrees of the adhesion projections.

5. The battery pack of claim 3, wherein an interval is provided at least partially between the second guide projection and the adhesion projections.

6. The battery pack of claim 1, wherein
a cooler is connected to an outer surface of the case at a spot, and
the adhesion projection is adhered to the inner surface of the case within the spot.

7. The battery pack of claim 1, further comprising:
a battery cell housed in the case, wherein
the component comprises a circuit component connected to the battery cell.

8. A method of disassembling the battery pack of claim 1, the method comprising cutting the adhesive by a wire saw.

* * * * *